United States Patent [19]

Nakamura

[11] Patent Number: 4,659,968

[45] Date of Patent: Apr. 21, 1987

[54] VERTICAL DEFLECTION CIRCUIT

[75] Inventor: Aki Nakamura, Nagaokakyo, Japan

[73] Assignee: Mitsubishi Denki Kabushiki Kaisha, Tokyo, Japan

[21] Appl. No.: 866,846

[22] Filed: May 27, 1986

[30] Foreign Application Priority Data

Jun. 20, 1985 [JP] Japan ................... 60-93986

[51] Int. Cl.⁴ .......................................... H01J 29/54
[52] U.S. Cl. ................................................... 315/398
[58] Field of Search ....................... 315/398, 396, 397

[56] References Cited

FOREIGN PATENT DOCUMENTS 2154084 1/1985 United Kingdom ................ 315/398

Primary Examiner—Theodore M. Blum

Attorney, Agent, or Firm—Sughrue, Mion, Zinn, Macpeak and Seas

[57] ABSTRACT

Circuitry for automatically vertically centering a video display on the face of a CRT when deviations result from different raster scanning times. A comparator 12 having inputs flanking a resistor 11 connected in series with the vertical deflection coil 3 detects the zero or picture plane center crossing points of the deflection signal. The zero crossing points are then time compared with a pulse signal (FIG. 3(e)) whose width represents the overall time duration of each raster scan for the picture or image being displayed, and a d.c. correction component is applied as necessary to the deflection signal such that the adjusted zero crossing points bisect the duration pulses to thus vertically center the display.

8 Claims, 4 Drawing Figures

VERTICAL DEFLECTION CIRCUIT

BACKGROUND OF THE INVENTION

This invention relates to a vertical deflection method and circuit for use in a personal computer display unit or the like which is capable of automatically correcting vertical deviations in the position of the video picture plane.

When a raster scanning display unit is accessed by a personal computer it is usually operated in a plurality of indicating modes which have different relative timing, for example a coarse display mode of 200 scanning lines and a high resolution mode of 400 scanning lines or more to furnish interchangeability with existing software and to implement new functions.

Further, two vertical deflection frequencies of 50 Hz and 60 Hz are commonly used corresponding to commercially available power supply frequencies. In such situations, when the timing between the video signal and the vertical sync signal differs due to the different indicating modes, the vertical position and width of the video picture plane are changed on the screen of the display tube. Users thus have to manually correct the vertical position and width of the video picture plane. With personal computers this makes setting the indicating mode in which a wide change in timing is required difficult, and limits the conditions for using the different indicating modes.

FIG. 1 shows a circuit diagram of a conventional vertical deflection circuit, wherein an input terminal 60 is connected to a single ended push-pull circuit (SEPP circuit) 30 comprising transistors 1, 2. Transistor 1 is connected to a d.c. supply terminal 61 and transistor 2 is grounded. The output terminal of the SEPP circuit 30, namely the emitter junction between the two transistors, is connected to one end of a vertical deflection coil 3.

The other end of the coil 3 is grounded through a series combination of a bypass capacitor 4 and a pincushion correction circuit (PCC circuit) 5. It is also grounded through a series combination of a resistor 6 and a correction circuit 8 comprising a transistor. The d.c. supply terminal 61 is connected to the junction between resistor 6 and the correction circuit 8 through a resistor 7, and is also grounded through a variable resistor 9. A sawtooth drive signal is applied to the input terminal 60 of the SEPP circuit 30 from an oscillator (not shown). The SEPP circuit amplifies such drive signal and generates a sawtooth a.c. current $i_v$.

The correction circuit 8 controls the d.c. current I flowing from the d.c. supply terminal 61 through the deflection coil 3, and varies the magnitude of such d.c. current according to the value of the variable resistor 9. The vertical deflection coil 3 deflects the beam of the cathode ray tube to scan the video picture plane in the vertical direction according to deflection current $(i_v+I)$.

The bypass capacitor 4 cuts off the d.c. component of the deflection current $(i_v+I)$. The PCC circuit 5 modulates the horizontal deflection current iH flowing through a secondary coil 52 with the vertical deflection current $i_v$ flowing through a primary coil 51.

It is assumed that the d.c. voltage determined by the value of the variable resistor 9 is $E_2$ as shown at point A in FIG. 1, and the average voltage of the a.c. current is $E_1$ as shown at point B. When $E_1 > E_2$, the d.c. current I flows from the d.c. supply terminal 61 through transistor 1, deflection coil 3, resistor 6, and the transistor in correction circuit 8 to ground. When $E_1 < E_2$, the d.c. current I flows from the d.c. supply terminal 61 through resistor 7, resistor 6, deflection coil 3, and transistor 2 to ground. This d.c. current I is given by $I=(E_2-E_1)R$ where R is the value of resistor 6. Accordingly, since the actual deflection current flowing through the coil 3 is $i_v+I$, when $I>0$, for example, the vertical position of the video picture plane on the screen of the cathode ray tube is shifted downwardly with respect to the center of the CRT. Conversely, when $I<0$ the vertical position of the video picture plane is shifted upwardly. The d.c. current I flowing through the deflection coil 3 is thus adjusted by changing the value of the variable resistor 9 to appropriately center the vertical position of the picture plane on the screen of the CRT.

In such a conventional vertical deflection circuit, users thus have to manually correct the vertical position of the video picture plane while viewing the screen of the CRT. Accordingly, such a circuit is not well suited for use in the display unit of a personal computer in which the indicating modes are frequently changed.

SUMMARY OF THE INVENTION

It is a principal object of this invention to provide a vertical deflection method and circuit capable of automatically correcting deviations of the vertical position of a video picture plane on the face of a CRT, particularly for use in a display unit operable in a plurality of indicating modes commanded by a personal computer.

This object is accomplished by the provision of a vertical deflection circuit for coinciding the vertical position of a video picture plane with the deflection center of a cathode ray tube, which includes a vertical deflection coil, an input circuit for supplying sawtooth a.c. current to the coil, a correction circuit for supplying d.c. current to the coil to shift the vertical position of the video picture plane, a circuit for detecting the zero or picture plane center crossing points of the deflection current, and a circuit for supplying a control signal to the correction circuit to vary the magnitude of the d.c. current on the basis of the detection circuit output and a signal representing the overall time duration of each raster scan.

The correction circuit comprises a transistor which varies the magnitude of the d.c. current according to its base current, and the detection circuit comprises a comparator which produces binary signals at the zero crossing points of the deflection current. The control circuit comprises a differential amplifier which adjusts the base current of the transistor on the basis of the binary signals and the scan duration signal.

DETAILED DESCRIPTION OF THE PREFERRED EMBODIMENT

Figure 1:
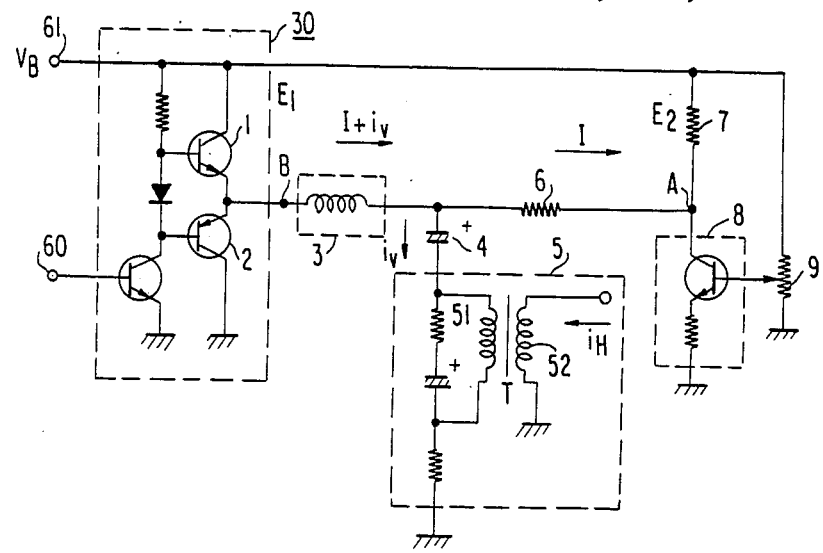
FIG. 1 is a circuit diagram of a conventional vertical deflection circuit.
Figure 2:
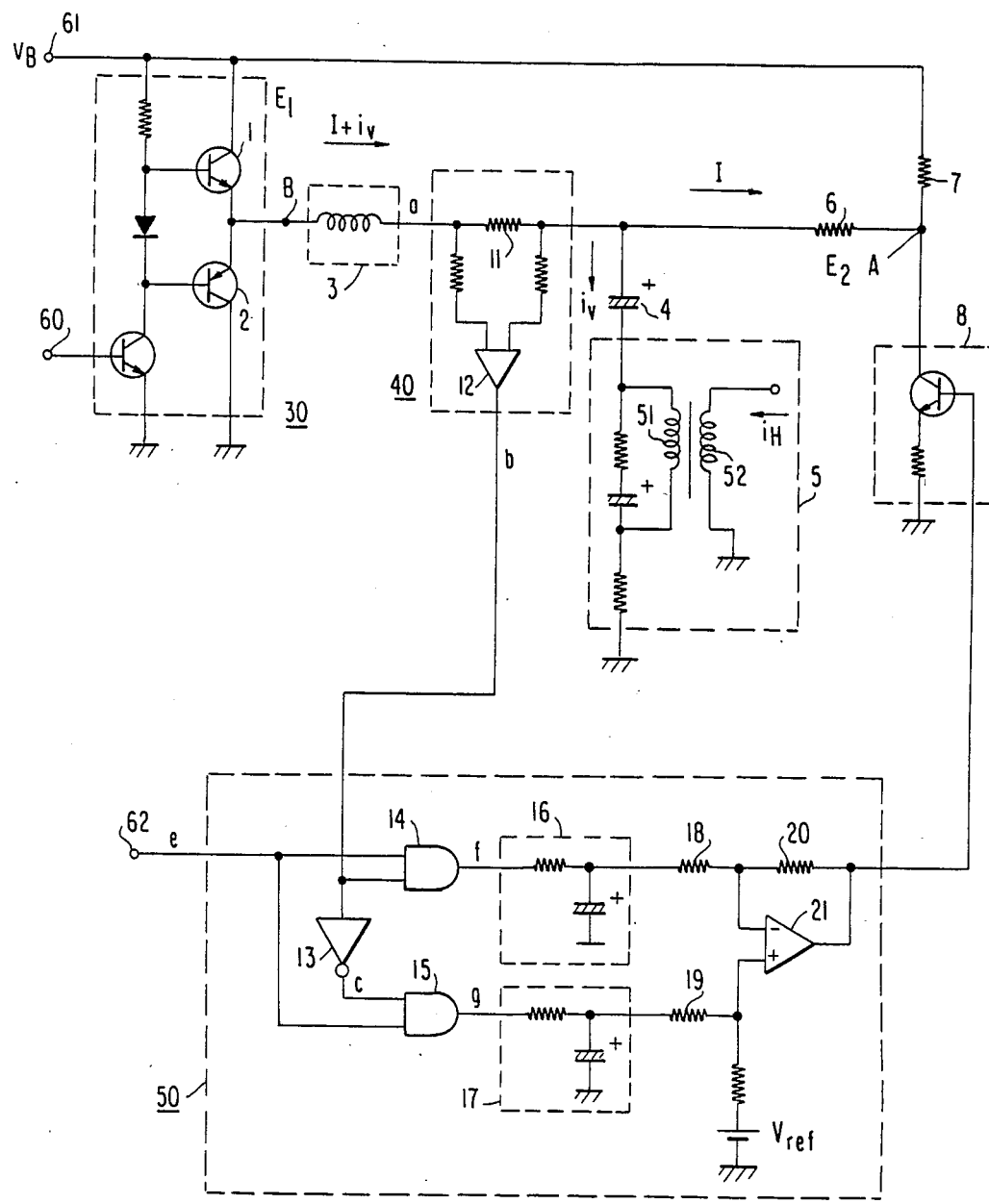
FIG. 2 is a circuit diagram of a vertical deflection circuit according to the present invention.

The embodiment of the invention shown in FIG. 2 has the same construction as that of the prior art shown in FIG. 1 except for the inclusion of a detection circuit 40 and a control circuit 50 instead of the variable resistor 9. Specifically and in greater detail, a resistor 11 for detecting the deflection current ($i_v+I$) is inserted in series between the coil 3 and the junction between the capacitor 4 and the resistor 6. A comparator 12 whose inputs flank the resistor 11 converts the deflection current into binary signals at the zero crossing point of the deflection current.

The comparator output is connected to one input terminal of an AND gate 14 and to one input terminal of an AND gate 15 through a NOT gate or Inverter 13. Logical mode indication signals representing the overall time duration of each raster scan and thus the vertical position of the video picture plane are applied to an input terminal 62 from a personal computer (not shown). Terminal 62 is connected to the other input terminals of the AND gates 14 and 15.

AND gate 14 performs logical multiplications of the mode indication signal and the comparator output; AND gate 15 performs logical multiplications of the mode signal and the inverted comparator output. These multiplication signals become pulse trains having pulse widths corresponding to the vertical deviation of the picture plane from the center position of the CRT.

The output of AND gate 14 is connected to one input of a differential amplifier 21 through an integrator 16 and a resistor 18; the output of AND gate 15 is connected to the other input of the differential amplifier through an integrator 17 and a resistor 19. The integrators convert the AND gate outputs into d.c. voltage signals.

A resistor 20 is inserted between resistor 18 and the differential amplifier output, and the latter is connected to the correction circuit 8. The differential amplifier, which compares the outputs of the integrators 16, 17, supplies control signals to the base of the transistor in the correction circuit. The correction circuit varies the magnitude of the d.c. component of the deflection current ($i_v+I$) according to the control signals from the differential amplifier, and thus shifts the vertical position of the video picture plane.

Figure 3:
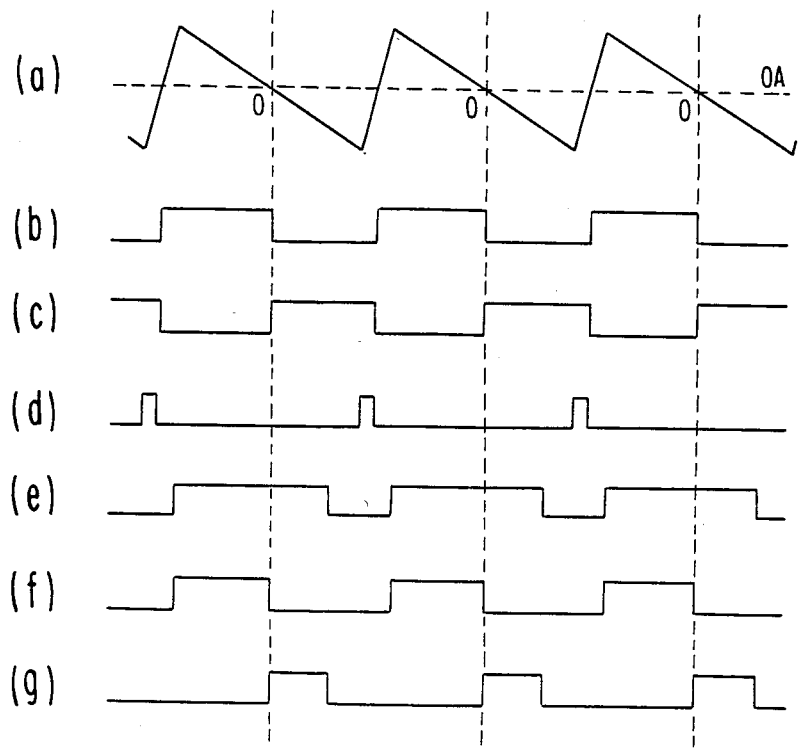
FIGS. 3 and 4 are timing diagrams for explaining the operation of the vertical deflection circuit shown in FIG. 2.
Figure 4:
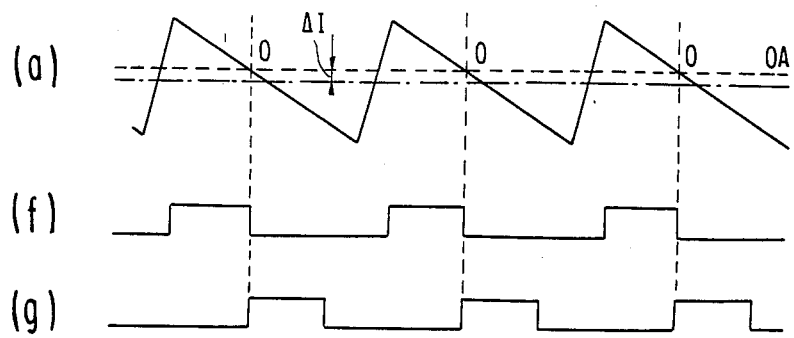

The operation of the circuit shown in FIG. 2 will be described with reference to the timing diagrams shown in FIGS. 3 and 4. When the deflection current ($i_v+I$) composed of the d.c. current I and the a.c. current $i_v$, as shown in FIG. 3(a), flows through the deflection coil 3 and resistor 11, a voltage appears in proportion to such deflection current at both ends of the resistor 11. The comparator 12 generates a binary signal at the zero crossing point of the differential voltage between the ends of the resistor, as shown in FIG. 3(b). The comparator output is applied to one input terminal of AND gate 14, and its inverted output as shown in FIG. 3(c) is applied to one input terminal of AND gate 15. The mode indication signal from the personal computer, as shown in FIG. 3(e), is applied to the other input terminals of the AND gates, and represents the effective period of the video signal, and thus the vertical position of the video picture plane, synchronized with the vertical sync signal shown in FIG. 3(d). The outputs of AND gates 14 and 15 are shown in FIGS. 3(f) and 3(g), respectively. These logical multiplication signals represent deviations between the center of the mode indication signal pulses and the zero crossing points of the deflection current, and thus also represent vertical deviations of the video picture plane from the deflection center of the CRT.

Accordingly, if the pulse width of the FIG. 3(f) signal is greater than that of the FIG. 3(g) signal, the vertical position of the video picture plane is shifted upwardly with respect to the deflection center. The differential amplifier 21 amplifies the difference between the outputs of the integrators 16 and 17, or the difference between the pulse widths shown in FIGS. 3(f) and 3(g), and generates a control signal for the transistor in the correction circuit 8. The latter changes the d.c. current I to be combined with the a.c. current $i_v$ according to the control signal from the amplifier 21 to correct the difference between the pulse widths shown in FIGS. 3(f) and 3(g), and thus the vertical deviation of the video picture plane. In the example shown in FIG. 3, when a d.c. correction current $\Delta I$ is added to the a.c. current $i_v$ as shown in FIG. 4(a), the zero crossing point of the deflection current is shifted to the left and the vertical position of the video picture plane is shifted downwardly. The pulse widths of the logical multiplication signals from the AND gates 14, 15 thus become the same as shown in FIGS. 4(f) and 4(g).

According to the present invention a vertical deflection circuit capable of automatically correcting deviations of the vertical position of the video picture plane is obtained with a simple and cost effective construction. Consequently, the vertical deflection circuit of this invention can be used in a display unit which is operated with various indication modes by a personal computer. Further, the omission of the variable resistor 9 and its associated manual control mechanism for adjusting the vertical position of the video picture plane significantly reduces the cost of manufacture.

What is claimed is:

1. A method for automatically vertically centering a video display on the face of a CRT, comprising the steps of:
    (a) detecting the zero crossing points of a bipolar sawtooth vertical deflection signal flowing through a vertical deflection coil,
    (b) time comparing the detected zero crossing points with the pulse durations of a signal representing the overall time duration of each raster scan, and
    (c) applying a d.c. correction current component to the vertical deflection signal in response to the time comparison to adjust the zero crossing points such that they bisect the time duration pulses.

2. An apparatus for automatically vertically centering a video display on the face of a CRT, comprising:
    (a) means (40) for detecting the zero crossing points of a bipolar sawtooth vertical deflection signal flowing through a vertical deflection coil,
    (b) means (50) for time comparing the detected zero crossing points with the pulse durations of a signal representing the overall time duration of each raster scan, and
    (c) means (8) for applying a d.c. correction current component to the vertical deflection signal in response to the time comparison to adjust the zero crossing points such that they bisect the time duration pulses.

3. A vertical deflection circuit for automatically centering a video display on the face of a cathode ray tube, comprising:
    (a) a vertical deflection coil (3);
    (b) an input circuit (30) for supplying sawtooth a.c. current to said vertical deflection coil;

(c) a correction circuit (8) for supplying d.c. current to said vertical deflection coil to shift the vertical position of said video display;

(d) a detection circuit (40) for detecting zero crossings of a composite deflection current comprising said d.c. current and said a.c. current; and (e) a control circuit (50) for supplying control signals to said correction circuit to control the magnitude of said d.c. current on the basis of the output of said detection circuit and a signal representing the time duration of a raster scan.

4. A vertical deflection circuit as claimed in claim 3, wherein said correction circuit comprises a transistor having a collector connected to a d.c. supply (61) and said vertical deflection coil, an emitter connected to ground, and a base connected to an output terminal of said control circuit.

5. A vertical deflection circuit as claimed in claim 3, wherein said detection circuit comprises a resistor (11) connected in series with said deflection coil, and a comparator (12) having input terminals connected to opposite ends of said resistor.

6. A vertical deflection circuit as claimed in claim 3, wherein said control circuit comprises a first logic gate (14) for processing the output of said detection circuit and said time duration signal, a second logic gate (15) for processing an inverted output of said detection circuit and said time duration signal, a first integrator (16) for integrating the output of said first logic gate, a second integrator (17) for integrating the output of said second logic gate, and a differential amplifier (21) for amplifying the difference between outputs of said first and second integrators.

7. A vertical deflection circuit as claimed in claim 6, wherein the output of said differential amplifier is applied as a control signal to said correction circuit to vary the magnitude of said d.c. current.

8. A vertical deflection circuit as claimed in claim 3, wherein said correction circuit comprises a transistor for varying the magnitude of said d.c. current according to its base current;

said detection circuit comprises a comparator (12) which produces binary signals corresponding to said zero crossings; and said control circuit comprises a differential amplifier (21) for providing a base current to said transistor on the basis of said binary signal and said time duration signal such that said zero crossings bisect pulse widths of said time duration signal.

* * * * *